United States Patent [19]

Thomson

[11] Patent Number: 4,760,278

[45] Date of Patent: Jul. 26, 1988

[54] TRANSFER SWITCH

[76] Inventor: Robert G. Thomson, 7540 Morrison Crescent, Langley, British Columbia, Canada, V3A 6Y3

[21] Appl. No.: 76,747

[22] Filed: Jul. 23, 1987

[51] Int. Cl.[4] .......................... H02J 9/00; H01H 9/26

[52] U.S. Cl. .......................................... 307/64; 200/18; 200/50 C

[58] Field of Search ..................... 200/17 R, 18, 50 C, 200/153 G, 153 H, 331, 332, 335–337, 50 AA; 307/23, 64, 65, 66, 29, 38, 41, 80; 361/345

[56] References Cited

U.S. PATENT DOCUMENTS

| | | | |
|---|---|---|---|
| 3,246,100 | 4/1966 | Russell | 200/50 C |
| 3,767,872 | 10/1973 | Whitchurch | 200/18 X |
| 3,778,633 | 12/1973 | DeVisser et al. | 307/64 |
| 3,936,782 | 2/1976 | Moakler et al. | 307/64 X |
| 4,016,385 | 4/1977 | Golioto | 200/18 X |
| 4,021,678 | 5/1977 | Moakler et al. | 307/64 |
| 4,051,335 | 9/1977 | Ericson et al. | 200/50 AA |
| 4,157,461 | 6/1979 | Wiktor | 200/18 |
| 4,189,649 | 2/1980 | Przywozny et al. | 307/64 |
| 4,206,329 | 6/1980 | Jarosz | 200/50 AA |
| 4,216,521 | 8/1980 | Merola | 361/345 |
| 4,231,029 | 10/1980 | Johnston | 340/658 |
| 4,270,031 | 5/1981 | Borona et al. | 200/50 C |
| 4,295,053 | 10/1981 | Kovatch et al. | 307/64 |
| 4,295,054 | 10/1981 | Kovatch et al. | 307/80 |
| 4,398,097 | 8/1983 | Schell et al. | 307/64 |
| 4,405,867 | 9/1983 | Moakler et al. | 307/64 |
| 4,423,336 | 12/1983 | Iverson et al. | 307/64 |

OTHER PUBLICATIONS

Russelectric Power Control Systems brochure entitled Automatic Transfer Switches, ©1985.

*Primary Examiner*—J. R. Scott
*Attorney, Agent, or Firm*—Bull, Housser & Tupper

[57] ABSTRACT

The transfer switch assembly typically automatically transfers electrical loads from a normal electrical power source to an emergency electrical power source upon reduction or loss of normal power source voltage. It can also automatically re-transfer the load to the normal power source when the normal voltage has been restored within acceptable limits. The device includes a rotor and couplers for cooperating with switch toggles of circuit breakers to actuate the circuit breakers. First and second links connect the rotor to the couplers. The links have outer ends connected to the couplers, and inner ends hingedly connected to the rotor at positions spaced circumferentially apart relative to the rotor axis. In this way, rotation of the rotor in one direction moves the couplers to open one circuit breaker and, after a short period of time, to close the remaining circuit breaker so that one circuit breaker opens prior to closing the other circuit breaker. The transfer switch can also be actuated manually.

18 Claims, 2 Drawing Sheets

TRANSFER SWITCH

BACKGROUND OF THE INVENTION

The invention relates to a transfer switch which transfers electrical loads from one power source to another power source. This is usually performed automatically by transferring power from a normal electrical power source to an emergency electrical power source upon reduction or loss of voltage. The invention also re-transfers the load to the normal power source when the normal voltage has been restored within acceptable limits.

Automatic transfer switches have been used for many years in applications where it is required to have an emergency power source that can be automatically and quickly connected to a load should the normal power supply to the load fail. Automatic transfer switches of this type are generally characterized by complexity in view of the need to ensure that the load is momentarily disconnected from both power sources. This momentary interruption of power usually causes nothing more serious than a flickering of lights, and is usually of no great consequence. The automatic transfer switches of the type according to the invention necessarily provide a clear "break-before-make" sequencing of switch contacts, so that the load is momentarily isolated and the two power sources are never connected together, which is an undesirable condition.

Several types of automatic transfer switches and/or associated circuitry are disclosed in U.S. Pat. Nos. 4,157,461 to Wiktor; 4,189,649 issued to Przywozny et al.; 4,398,097 issued to Schell et al. and 4,423,336 issued to Iverson et al. Many types of automatic transfer switches are available to actuate switch toggles of conventional molded-case circuit breakers, but sometimes the circuit breakers are not easily adaptable to be actuated by particular automatic transfer switches. Some of the automatic transfer switches have complex cam mechanisms to provide fine adjustment for opening the circuit breaker, and subsequent closing of the remaining circuit breaker, so as to ensure the clear "break-before-make" sequence of operation. The means to provide this adjustment results in complexity, and requires some skill in setting up the transfer switch to ensure reliable operation. The necessary adjustment to provide the correct sequence is time consuming and is subject to human error.

In some automatic transfer switches, a motor is required to rotate the cam mechanism which actuates the switch toggles. The motor rotates the cam through a precise angle during the operation of the transfer switch, and with some designs the cam is required to stop in a critical position after complete actuation of the transfer switch. This often requires a brake on the motor or an escapement means which allows for disconnection of the motor from the cam mechanism so that "over-travel" of the motor is isolated from the cam rotation. The brakes and/or escapement means of the prior art transfer switches increase complexity and require additional time for maintenance and checking, which must be performed periodically.

Furthermore, when servicing such transfer switches provided with motor-driven cams, it is convenient to provide a manual operation mode wherein the motor drive and the cam means can be disconnected to permit manual rotation of the cam. Also, for servicing, it is necessary to sometimes isolate the load from both power sources, and both of the requirements above tend to increase complexity of prior art automatic transfer switches.

Also, some prior art transfer switches have a relatively short period or "operating differential" betwee breaking contact with one power source, and making contact with the remaining power source. Some prior art transfer switches are not easily adjustable to increase the period during which the load is isolated and this can present difficulties with the type of electrical load which re-generates electricity immediately subsequent to disconnection from the source. Electrical motors, when disconnected from a first power source, immediately re-generate electricity, and when the new or second power source is to be connected, an out-of-phase connection to the second power source may cause damage to equipment. Usually, the said re-generation is of a very short duration, and problems associated with out-of-phase re-closing can be reduced if the load can be de-energized for a substantial period of time, for example greater than 0.5 seconds. Transfer switches which would otherwise operate with relatively short periods where the load is isolated or de-energized consequently require either a pause in midtravel, or means to detect phase of the two sources prior to connection, so that the load is transferred only while the two sources are in phase. Both of these solutions to out-of-phase reclosing problems increase complexity and reduce reliability of the transfer switch due to introduction of additional control devices.

SUMMARY OF THE INVENTION

The invention reduces the difficulties and disadvantages of the prior art by providing an automatic transfer switch assembly which is mechanically relatively simple, and can be produced and maintained at relatively low cost when compared with other automatic transfer switches. While the device is simple, it is easily adjustable to accommodate the majority of common circuit breakers. Furthermore, the design is easily adjustable to provide a substantial period during which the load is de-energized, which facilitates connection to types of loads that re-generate electricity immediately subsequent to disconnection from a power source. Furthermore, the invention has an actuating mechanism which can easily tolerate over-travel of the electric motor resulting from inertia of the motor. Thus, there is no requirement for a brake on the motor and/or for escapement means which would allow for disconnection of the motor from the actuating mechanism, so as to isolate the mechanism from the overtravel of the motor. Most applications require automatic operation, but manual operation can be easily substituted.

A transfer switch assembly according to the invention has a body, a rotor means, first and second coupling means, and first and second link means. The rotor means is mounted for rotation about a rotor axis relative to the body. The first and second coupling means operatively connect first and second switch toggles of first and second circuit breakers to actuate the circuit breakers, the coupling means being mounted for mvoement relative to the body. The first and second circuit breakers are associated with the first and second power sources, for example a normal power source and an emergency power source respectively. The first and second link means connect the rotor means to the first and second coupling means respectively. The link means have outer ends connected to the coupling means, and inner ends hingedly connected to the rotor means at positions spaced circumferentially apart relative to the rotor axis. In this way, rotation of the rotor means in one direction moves the coupling means to open one circuit breaker, and after a period of time, to close the remaining circuit breaker. Thus, one circuit breaker opens prior to closing the other circuit breaker to ensure that an electrical load is momentarily isolated from both power sources.

In one embodiment, the first and second coupling means are hinged for rotation about first and second hinge axes respectively, which axes are disposed generally parallel to the rotor axis. The inner ends of the link means are hinged to the rotor means at fixed positions, and the outer ends of the link means are hinged to the respective coupling means. Preferably, an extension of the rotor axis passes between the first and second coupling means, and the inner ends of the link means are spaced circumferentially apart on the rotor means at a sector angle of about 90 degrees relative to the rotor axis. Adjustment means for adjusting the lengths of the link means is also provided.

A detailed disclosure following, related to drawings, describes a preferred embodiment of the invention which is capable of expression in structure other than that particularly described and illustrated.

DETAILED DISCLOSURE

FIG. 1

Figure 4:
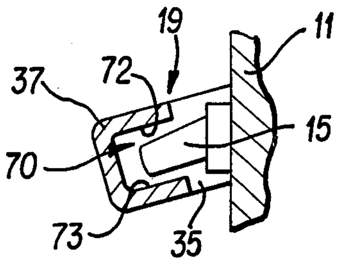
FIG. 4 is a fragmented, simplified section at enlarged scale showing cooperation of the invention with a switch toggle.

An automatic transfer switch assembly 10 according to the invention has a body 13 and is shown cooperating with first and second circuit breakers 11 and 12 which are connected to a normal electrical supply and an emergency electrical supply respectively. The circuit breakers 11 and 12 have respective switch toggles 15 and 16 which are shown engaged by first and second yokes 19 and 20 of the invention. Three electrical terminals severally 22, are shown disposed between the circuit breakers 11 and 12 and are connected by wires, not shown, to a load as well as to appropriate portions of the circuit breakers, as is well known. The circuit breakers are conventional moulded case types and are disposed so that the switch toggle of a particular breaker is inclined towards the terminals 22 when that particular circuit breaker is closed, and consequently the switch toggle is inclined away from the terminals 22 when that particular circuit breaker is opened. Consequently the circuit breakers are "reversed" relative to each other.

The first and second yokes 19 and 20 are mounted for rotation relative to the assembly about first and second hinge axes 25 and 26 respectively, so as to engage and swing the respective switch toggles between respective open and closed positions as will be described. The first yoke 19 has a pair of spaced parallel yoke arms 35 and 36 and a toggle connector 37 extending therebetween and cooperating directly with the switch toggle 15. It can be seen that the yoke arms straddle the circuit breaker 11 and have inner portions hinged for rotation about the first hinge axis 25. The arms have outer portions carrying the toggle connector which extends therebetween to define the U-shaped yoke. The second yoke 20 is generally similar and is mounted for similar hinging movement relative to the second circuit breaker 12 to actuate the switch toggle 16.

Figure 1:
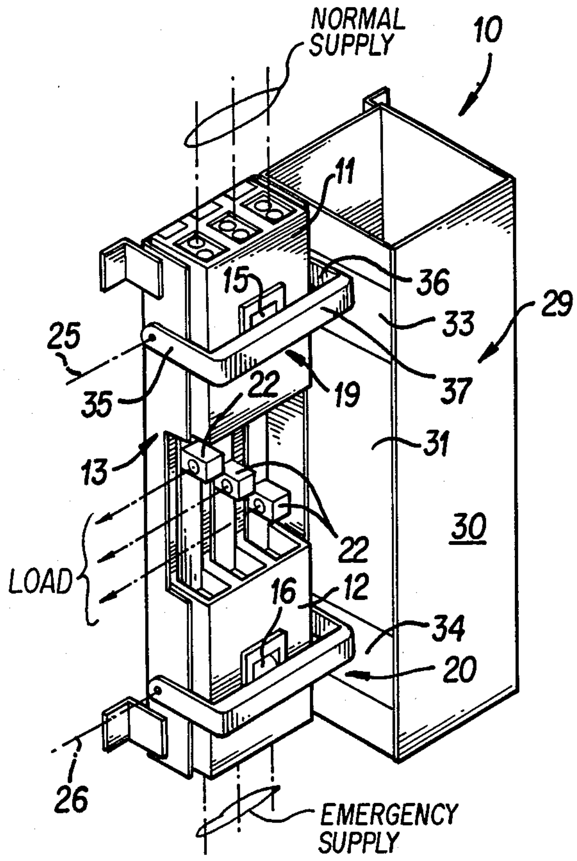
FIG. 1 is a simplified perspective view of the apparatus shown cooperating with a pair of circuit breakers, some details of the apparatus being obscured by a control compartment box which encloses portions of the invention.

The assembly 10 includes a control compartment 29 which is disposed to one side of, and extends between, the circuit breakers 11 and 12. The compartment 29 encloses an actuating mechanism of the invention, not shown in FIG. 1, which swings the yokes about the respective hinge axes in a generally parallel manner so that one circuit breaker is opened and the remaining circuit breaker is closed in sequence. This is to provide a momentary delay during which the load is isolated or disconnected from both of the electrical power sources. The compartment 29 has a hinged door 30, and an inner wall 31 which has first and second clearance openings 33 and 34 which provide clearance for connections between the first and second yokes 19 and 20 and the actuating mechanism within the compartment 29 as will be described.

FIG. 2–5

Figure 2:
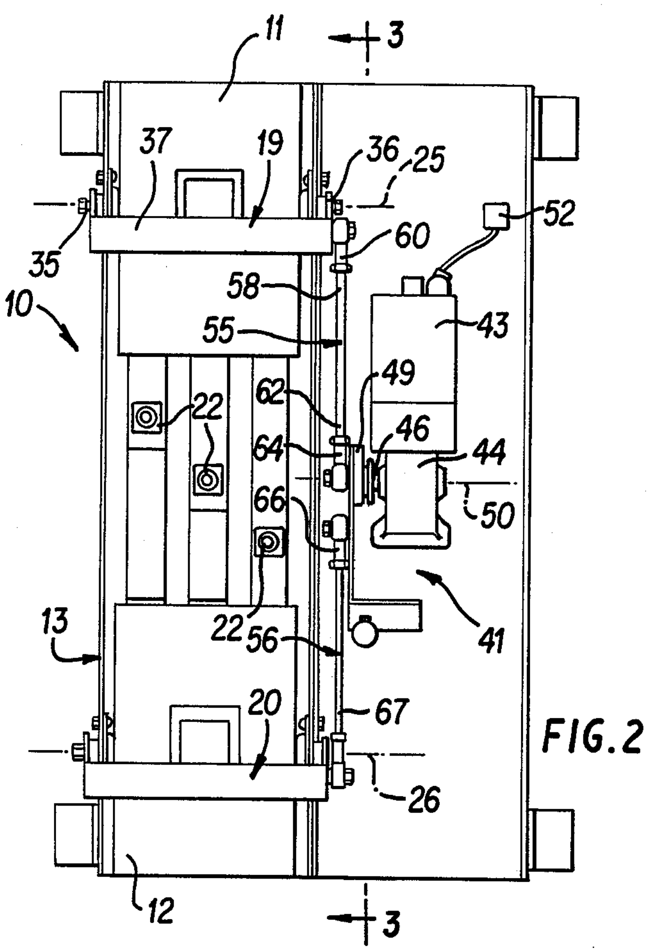
FIG. 2 is a simplified front elevation of the invention, a door of the control compartment being removed to show internal detail.

Referring to FIG. 2, the actuating mechanism 41 within the compartment 29 includes an electrical motor 43 having a right-angled output gear box 44 which has an output shaft 46. A rotor means 49 is an arm mounted radially on the output shaft 46 for rotation about a rotor axis 50. It can be seen that the first and second circuit breakers 11 and 12 are disposed as "mirror images" of each other about an extension of the rotor axis 46 so that open and closed positions of the circuit breakers are disposed symmetrically of the extension of the rotor axis. Similarly, the extension of the rotor axis passes symmetrically between the first and second coupling means, and thus serves as a general horizontal axis of symmetry of the assembly.

A control means 52 supplies power to the electrical motor 43 from a power source that is about to be connected, and is controlled by known means, including electrical switches, not shown, which are activated when either the normal power source generates a voltage less than a minimum threshold, so as to cause transfer to the emergency power source, or alternatively the electrical switches are activated to cause re-transfer to the normal power source, when the normal power source has recovered. A controlling device having voltage detecting and switching capabilities to actuate the electric motor 43 from either power source is well known in the trade, and forms no portion of the present invention. The control means 52 provides a limiting means for limiting rotation of the rotor to that necessary to open one circuit breaker and to close the other circuit breaker, the limiting means being responsive to movement of the yokes. Prior art limiting means can be used, for example simple limit switches which are actuated by means responsive to movement of the yokes, or equivalent means. As will be described, over-travel of the motor can be accommodated by the invention, which contrasts with some prior art devices.

The invention includes first and second link means 55 and 56 which extend between the rotor means 49 and first and second yokes 19 and 20 respectively. The link means are essentially similar and thus the first link means only will be described in detail. The first link means has an outer end 58 connected to the first yoke means 19 by a bolt/swivel connector 60. The outer end 58 of the link means is hinged to the arm 36 of the yoke 19 at a position intermediate of inner and outer portions of the arm, that is intermediate of the toggle connector 37 and the hinge axis 25. Clearly, a wide degree of adjustment is possible to select an appropriate yoke movement in response to rotation of the rotor means as will be described. The first link means has an inner end 62 which is similarly connected by a bolt/swivel connector 64 to the rotor means 49. The swivel connectors are partially spherical hinge connectors which are preferably threaded onto respective ends of the link means, and provided with undesignated lock nuts to permit adjustment of length of the link means. Thus, the link means is hingedly connected at opposite ends thereof to the rotor means and to the yoke.

Figure 3:
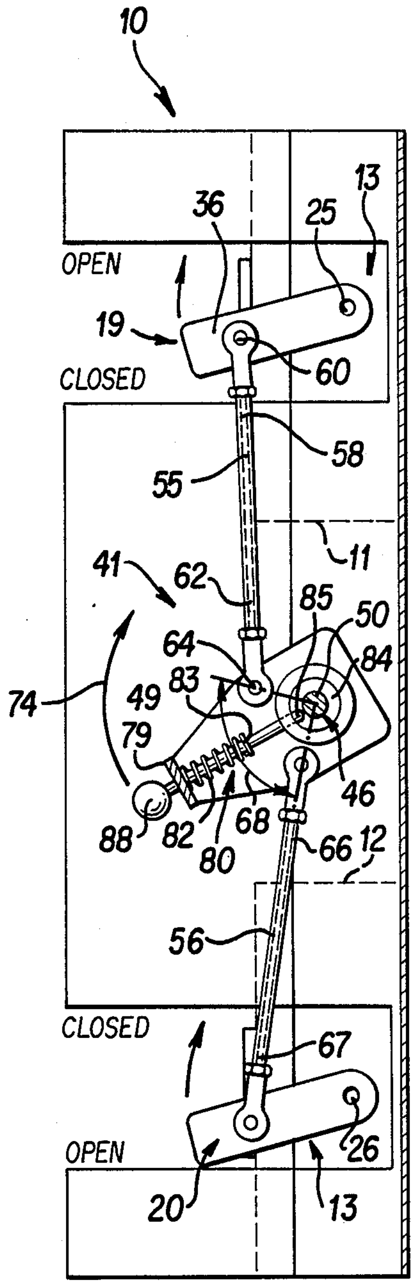
FIG. 3 is a simplified side elevation of a portion of the invention as seen generally from line 3—3 of FIG. 2.
Figure 5:
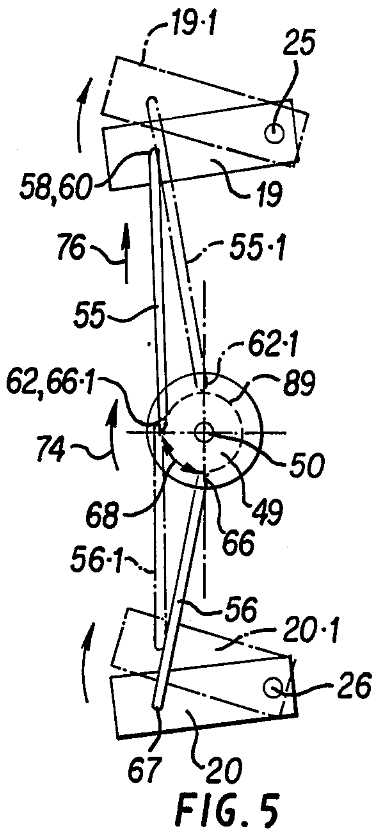
FIG. 5 is a simplified diagram, similar to FIG. 3, showing an actuating mechanism according to the invention in two positions.

The second link means 56 has an inner end 66 similarly hingedly connected to the rotor means, and an outer end 67 similarly hingedly connected to the yoke 20. It can be seen that the threaded connection between the swivel connectors and the link means provides adjustment means for adjusting the lengths of the link means. As best seen in FIGS. 3 and 5, the inner ends 62 and 66 of the first and second link means are spaced circumferentially apart on the rotor means at a sector angle 68 of about 90 degrees relative to the rotor axis 50. This provides a particular sequencing of actuation of the circuit breakers as will be described.

As seen only in FIG. 4, the first toggle connector 37 of the yoke 19 includes a toggle recess 70 defined in part by connector faces 72 and 73 respectively which are spaced apart sufficiently to accept the switch toggle 15 therebetween. There is a variation in maximum dimensions of switch toggles of the major manufacturers, and the recess 70 is sufficiently large to accommodate the largest switch toggle of the most common manufacturers. The recess 70 is adapted to face inwardly towards the hinge axis 25, (not shown in FIG. 4) so that as the yoke member 19 swings about the hinge axis, the toggle is actuated between closed and open positions and vice versa. Because axes of rotation of the switch toggle and the toggle connector 37 may not be coincident sufficient clearance is required between the recess and the switch toggle to prevent interference or binding therebetween. Clearly, for the smaller toggles additional clearance or lost motion will inevitably exist between the toggle and the toggle recess than for the larger toggles. This additional clearance is of no significance in the present invention which can accommodate several types of moulded case circuit breakers, which contrasts with some prior art transfer switches.

From the above it can be seen that the yoke is a coupling means adapted for cooperation with the switch toggle of a circuit breaker to actuate the circuit breaker associated with a particular power source. Also, it can be seen that the coupling means are hinged for rotation about respective hinge axes which are disposed generally parallel to the rotor axis.

Referring to FIG. 3, a manual lever 80 is provided within the control compartment 29 and is releasably connectable to the rotor means 49 so as to permit manual rotation of the rotor means as required, without use of the electrical motor 43. The manual lever 80 is a straight rod which is mounted for radial movement relative to the rotor axis and is carried within an opening of a rotor guide 79 which extends from an outer portion of the rotor means and guides the lever for a longitudinal movement relative to the rotor means. The lever 80 has an inner end 85 adapted to engage an undesignated radially disposed opening in a shaft sleeve 84 secured to the shaft 46 so as to lock the rotor means 49 to the shaft 46. A compression coil spring 82 encloses a portion of the lever 80 and is interposed between a spring stop 83 carried on the lever and the guide 79. The spring 82 forces the end 85 of the lever into the undesignated opening in the shaft sleeve so as to engage the rotor means with the motor. This engagement represents a normal mode of operation and permits the rotor means to be rotated by actuating the motor 43.

The lever has an outer end 88 adapted for gripping by an operator to move the lever radially outwardly against the spring force so as to withdraw the end 85 out of engagement with the shaft sleeve. When the end 85 is disengaged from the shaft sleeve, the lever 80 and the rotor means 49 can be rotated on the motor shaft without corresponding rotation of the motor shaft. Thus the rotor means can be easily disengaged from the motor. It can be seen that the manual lever 80 is adapted to releasably connect and disconnect the rotor means and the powered shaft so as to permit powered or manual rotation of the rotor means as required. It can be seen that the end 85 of the lever serves as an engagement means mounted for movement with the manual lever, and is adapted to engage the powered shaft. The engagement means is adapted for movement by an operator to move the engagement means to engage or disengage the powered shaft as required. The manual lever 80 is particularly required for servicing of the apparatus when power to the motor is disconnected, or the motor is inoperative. Also, by use of the manual lever the rotor can be set in a neutral position i.e. in an intermediate position in which both circuit breakers are open, so that the load is isolated from both power sources for ease of servicing. This neutral position is attainable for a relatively short period during automatic operation of the transfer switch as will be described.

Referring to FIG. 5, the rotor means 49 is shown simplified as a disk mounted for rotation about the shaft 46 and axis 50. The yokes 19 and 20 and the link means 55 and 56 are shown in full outline in initial positions representing normal power supply to the load, that is the yokes are shown inclined downwardly, which reflects the position also shown in FIGS. 2 and 3. Thus, switch contacts controlled by the yoke 19 are closed, and those controlled by the yoke 20 are open. In the initial positions, the first link means 55 is disposed generally tangentially to the axis 50 of the rotor, and the second link means 56 is disposed generally radially of the axis 50. The terms "generally tangentially" and "generally radially" are terms that refer to approximate geometrical relative positions between the link means and a circle 89 (broken outline) concentric with the axis 50 and containing inner ends 62 and 66 of the link means. In practice, the second link means is not "disposed radially" with respect to the axis 50 until the rotor has rotated a few degrees in direction of an arrow 74, which occurs during initial movement of the rotor means.

When the rotor means 49 rotates through 90 degrees from the initial position as shown, the first link means assumes a broken outline final position 55.1, which is generally equivalent to the initial position of the second link means 56 prior to the rotation, and is now disposed "generally radially" of the axis 50. In this position, the yoke 19 has swung to a broken outline final position 19.1 about the first hinge axis 25. Likewise, when the rotor means has rotated through 90 degrees from the initial position as shown in full outline, the second link means,assumes a broken outline final position 56.1 and is now disposed "generally tangentially" of the axis 50 and is generally similar to the initial position of the first link means 55 prior to rotation. Similarly, the second yoke means has assumed a broken outline position 20.1 after rotating about the second hinge axis 26. In the final position, the circuit breaker 11 is open, and the breaker 12 is closed.

Since the motor 43 rotates at an essentially uniform speed as the output shaft 46 of the gear box rotates through 90 degrees, the rotor 49 similarly rotates uniformly from the initial position to the final position. In this mode of operation, the rotor passes uniformly through the intermediate or neutral position in which both circuit breakers are open, and the load is isolated from both power sources, which are also isolated from each other. When both circuit breakers are open together the apparatus is in the neutral position during which electrical regeneration of the load can decay rapidly to avoid problems of out-of-phase re-connection of the load to the new electrical source. If necessary, the duration of the time interval in the neutral position can be increased by decreasing the speed of rotation of the motor, or the gear box ratio, as may be appropriate. Alternatively, the motor can pause momentarily as the rotor enters the neutral position, and can then resume the complete rotation through the remaining portion of the 90 degrees. This deliberate pause in the neutral position is termed a neutral position time delay and it can be controlled electronically by known means provided in the control means 52 which controls current to the motor 43. Stopping and restarting of the motor is adjustable for selecting the exact time period after one circuit breaker opens, and the remaining circuit breaker closes.

FIG. 6

Figure 6:
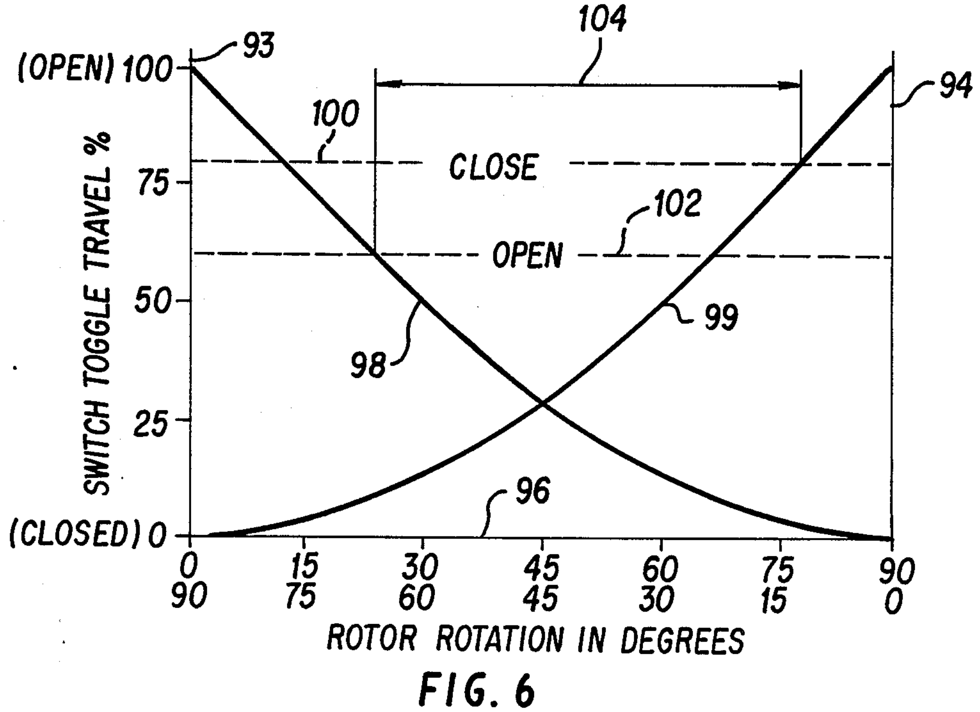
FIG. 6 is a simplified graphical representation of switch toggle travel with respect to rotor rotation, to illustrate operating differential of switch contacts.

FIG. 6 shows a graphical representation of the angle of separation between opening and closing of switch contacts of the circuit breakers 11 and 12 with respect to rotation of the rotor means through 90 degrees. Vertical axes 93 and 94 show complete travel of the switch toggle of the circuit breakers 11 and 12 respectively, in which 0 percent represents the toggle switch outermost position when the circuit breaker contacts are open, and 100 percent represents the toggle switch innermost position when the circuit breaker contacts are closed. A horizontal axis 96 represents rotor rotation over a range of 90 degrees in either direction. Curve 98 shows the switch toggle travel with reference to rotor rotation for the switch contacts of the circuit breaker 11, and curve 99 shows the similar relationship for switch contacts of the circuit breaker 12. Horizontal broken line 100 shows a position at which switch contacts close for either switch, typically at about a 78 percent movement of the respective switch toggle. Similarly, horizontal line 102 shows a position at which the switch contacts open, typically at about 60 percent of switch toggle travel.

When considering opening of the circuit breaker 11, and closing of the circuit breaker 12, rotation of the rotor is represented by moving in the direction of left to right along the axis 96 of the graph. Intersection of the curve 98 with the line 102, and the curve 99 with the line 100, represents corresponding opening and closing of the circuit breakers 11 and 12 respectively. Spacing 104 is a representation of an operating differential between the opening of the switch contacts of the circuit breaker 11, at about 22 degrees and the closing of the switch contacts of the circuit breaker 12 at about 77 degrees. It can be seen that this opening and closing occurs over a range of approximately 55 degrees of rotor rotation. This means that the rotor means rotates through approximately 55 degrees between opening of the switch contacts of the first circuit breaker 11, and closing of the contacts of the second circuit breaker 12. This provides an operating differential of about one second for normal motor speed, which is sufficient for most applications to overcome problems relating to regeneration which can occur with some loads, most notably electric motors which tend to regenerate electricity immediately subsequent to disconnection from a power source.

The example given above is for a typical circuit breaker, in which the invention has been adjusted to provide an operating differential 104 approaching maximum. Clearly, adjusting the gear box ratio, motor speed and/or operating differential will change the time interval in the neutral position during which the contacts are open. The geometry of the rotor and link means provides an inherent operating differential in that one circuit breaker opens before the other circuit breaker closes. The operating differential results in the said time interval when both circuit breakers are open which, among other factors, is proportional to angular spacing between the hinge connections of the inner ends of the link means with the rotor. Stroke of the yokes must clearly be compatible with movement of the toggle switch between inner and outer positions, and this stroke is dependent on the radius of the circle 89 and the angle through which the rotor rotates. Clearly, to obtain maximum benefits of the invention relating to the differences in longitudinal speed of the link means controlling the circuit breaker that is to be opened, and the circuit breaker that is to be closed, preferably the sector angle 68 should be 90 degrees. While a small variation from 90 degrees is permissible, maximum speed differential is attained when the angle is exactly 90 degrees.

From the above, it is seen that the invention has means which provide a wide selection of the length of the stroke of the link means actuating the yokes and the operating differential and resulting time interval between opening one circuit breaker and closing the other.

OPERATION

In normal operation, the normal power supply is fed to the circuit breakers 11 and leaves the apparatus through the terminals 22. If voltage in the normal supply drops below a threshold, a sensor, not shown, actuates the emergency power supply which requires a finite time to generate a minimum voltage, and then to supply power through the means 52 to the motor 43.

Referring mainly to FIG. 5, when the emergency supply reaches an acceptable threshold level, the motor 43 rotates the rotor means 49 from an initial position in direction of the arrow 74, which moves the first link means 55 per arrow 76 which is initially disposed essentially tangentially of the rotor. This produces a relatively fast initial movement of the first yoke 19 in the corresponding direction, swinging the switch toggle 15 to an open position. Referring to FIG. 6, it can be seen that the contacts would open at approximately 22 degrees of rotor rotation from the initial position. The rotor means 49 continues rotating for a total of 90 degrees, at which time the first link means 55 becomes generally radially disposed to the rotor axis 50 as shown in broken line at 55.1. The inner end 62 of the link means 55 is now located at 62.1, as shown in broken outline. Rotating a conventional crank shaft with a connecting rod to approach "top dead centre" would be similar to movement of the first link means sometime after opening of the switches of the circuit breaker 11 and prior to the final position. At this time essentially longitudinal movement of the first link means 55 gradually decelerates and eventually becomes zero at "top dead centre". Consequently, any over-travel of the rotor means 49 produces negligible or slightly reverse longitudinal movement of the first link means, and can be easily tolerated by the lost motion between walls of the recess 70 and the toggle 15 and allowable reverse toggle travel.

In contrast, because the second link means 56 is disposed generally radially of the rotor means, initial movement of the rotor means produces a relatively low speed initial longitudinal movement of the second link means, which is generally similar to movement of the connecting rod of a conventional crankshaft arrangement when leaving top dead centre. Continued rotation of the rotor means gradually accelerates longitudinal movement of the second link means 56, which attains a maximum as the rotor finishes the 90 degree angle of rotation. At this time, positions of the link means 56, shown on broken outline at 56.1, and the inner end 66 of the first link means, at 66.1, become co-incident with the original position of the inner end 62 of the first link means prior to rotation of the rotor means. Referring to FIG. 6, it can be seen that the contacts of the second circuit breaker will close after about 77 degrees of rotation of the rotor means, providing the operating differential 104 of about 55 degrees. Again, over-travel of the rotor means for the second link means can easily be tolerated as the switch toggle about to be closed does not require 100 percent of the available toggle movement.

Thus, from the above, it can be seen that the 90 degree sector angle between the inner ends 62 and 66 of the first and second link means provides unobvious advantages not found in prior art apparatus with such a simple structure. The switch that is about to be opened is actuated by a link means having an inner end positioned on the rotor means where initial rotor means movement produces a relatively fast longitudinal movement of the link means. This inner end is disposed at an initial maximum velocity position, which ensures that the switch that is about to be opened opens relatively early in the actuation period. When the rotor has rotated through 90 degrees, the first link means becomes stationary and any overtravel has no affect once the switch has been opened.

Similarly, the switch that is about to be closed is actuated by a link means having an inner end positioned on the rotor means where initial rotor means movement produces relatively slow longitudinal movement of the link means, which ensures the required delay between opening of one contact and closing of the other. The inner end 66 of the second link means is travelling at a maximum velocity in a direction away from the yoke 20 when the rotor has rotated through 90 degrees. The switch toggle does not require to be moved completely by the yoke to the end of its travel, and thus the motor can be de-energized shortly before the rotor has rotated through 90 degrees.

During initial installation of the invention, the lengths of the link means are adjusted as necessary to accommodate clearance between the toggle recess and respective switch toggle. Preferably, the threads at opposite ends of the link means are opposite-handed, so that rotation of the link means itself relative to the respective bolt/hinge connectors permits easy adjustment of length between axes of the respective bolt/hinge connectors. The undesignated lock nuts are loosened prior to such adjustment, and securely tightened afterward so as to maintain the required setting.

Clearly, when normal voltage has been restored to the normal power source, the reverse sequence of actuation of contacts occurs. Thus the second switch toggle is actuated first to open the second circuit breaker 12 and the first switch toggle is closed subsequently to close the first circuit breaker 11 to assume the original position of FIG. 3.

In summary, it can be seen that, in a first or initial operating position of the apparatus, the link means extending to the coupling means cooperating with the circuit breaker that is presently closed is disposed generally tangentially relative to the rotor axis. Similarly, in this said first or initial operating position, the remaining link means extending to the coupling means cooperating with the circuit breaker that is presently open is disposed generally radially relative to the rotor axis. This relative disposition of the link means and rotor means applies whether the transfer switch assembly is operating under a normal power supply, or under an emergency power supply. Thus the advantages relating to a relatively early opening of contact switch, followed by relatively late closing of remaining contact switch applies in both situations.

For servicing, the manual lever 80 is accessed by opening the door 30 of the control compartment 29 which exposes the actuating mechanism 41 as shown in FIG. 2. The lever 80 is withdrawn radially so that the inner end 85 thereof disengages the opening in the shaft sleeve and permits swinging of the lever and concurrent rotation of the rotor means to actuate the circuit breakers as required without use or rotation of the motor 43.

It can be seen that rotation of the rotor means in one direction moves the coupling means to open one circuit breaker, and after a short period of time to close the remaining circuit breaker, so that one circuit breaker opens prior to closing the other circuit breaker. This ensures that the electrical load is momentarily isolated from both power sources thus ensuring that both electrical sources will never be mutually connected. This is accomplished with a very simple mechanism which has a wide range of adaptability in contrast with prior art devices.

ALTERNATIVES

The invention is shown with the hinge axes disposed generally parallel to the rotor axis. Clearly, it may be advantageous in some applications to mount the rotor means for rotation about an axis which is disposed normally to the hinge axes, which will still permit the attainment of the advantages of the invention. Clearly, the 90 degree sector angle between inner ends of the link means would still be required.

Also, the coupling means are shown to be yokes having a pair of spaced parallel arms and a toggle connector extending between outer ends of the arms. With some applications it might be necessary to eliminate one of the arms so as to provide a coupling means with one arm and a toggle connector connected to an outer portion of the arm to form an L-shaped coupling means. In either arrangement, the outer ends of the link means are hinged to the respective arms at positions intermediate of the inner and outer portions of the arms, so as to provide sufficient movement of the coupling means to actuate the switches as described.

As shown, the transfer switch assembly is disposed in a normal configuration, wherein normal power is supplied to an upper portion of the transfer switch assembly, emergency power is supplied to a lower portion of the transfer switch assembly, and the load is fed from a position intermediate of the upper and lower portions, usually laterally from a side of the switch assembly. In this disposition, the closed position of each circuit breaker is closest to the extension of the rotor axis, and the open position of each circuit breaker is furthest from the extension of the rotor axis. Clearly, the advantages of the invention could be attained if the normal and emergency electrical supplies were fed laterally together in from the side of the switch assembly, and a bifurcated load wiring were used to connect to upper and lower portions of the switch assembly. While this is not desirable, and in many situations is not practical, the advantages of the invention could still be attained.

The discussion above could cover a typical situation where the first or "normal" power source is a utility power source, for example from a power station, and the emergency power source is a self-contained, engine driven electrical generator. The invention is not limited to this application, and clearly both the "normal" source and the emergency source could be two utility power sources, or alternatively could be two power sources from driven generators. Any application of two different electrical sources could be used with the present invention.

While the invention is described for automatic operation, that is when the rotor means is driven by the motor following a drop in voltage from the normal electrical power source, the main advantages of the invention relating to the operating differential can be obtained with manual rotation of the rotor means as described. This would have applications where it is desired merely to transfer an electrical load between two power sources manually, without the additional complexities of voltage sensing means, a motor to rotate the rotor and other apparatus related to automatic operation.

I claim:

1. A transfer switch assembly having:

(a) a body and a rotor means mounted for rotation about a rotor axis relative to the body, (b) first and second coupling means for operatively connecting first and second switch toggles of first and second circuit breakers to move the switch toggles to actuate the circuit breakers, the coupling means being mounted for movement relative to the body, (c) first and second link means connecting the rotor means to the first and second coupling means respectively, the link means having outer ends connected to the coupling means and inner ends hingedly connected to the rotor means at positions spaced circumferentially apart relative to the rotor axis, so that the rotation of the rotor means in one direction moves the coupling means to open one circuit breaker, and after a period of time, to close the remaining circuit breaker, so that one circuit breaker opens prior to closing the other circuit breaker to ensure that an electrical load is momentarily isolated from first and second power sources associated with the first and second circuit breakers respectively.

2. An assembly as claimed in claim 1 in which:

(a) the first and second coupling means are hingedly connected to the body for rotation relative to the body about first and second hinge axes respectively, which axes are disposed generally parallel to the rotor axis, (b) the inner ends of the link means are hingedly connected to the rotor means at fixed positions, and the outer ends of the link means are hingedly connected to the respective coupling means.

3. An assembly as claimed in claim 1 in which:

(a) an extension of the rotor axis passes between the first and second coupling means.

4. An assembly as claimed in claim 2 in which:

(a) an extension of the rotor means passes between the first and second coupling means.

5. An assembly as claimed in claim 1 in which:

(a) the inner ends of the link means are spaced circumferentially apart on the rotor means at a sector angle of about 90 degrees relative to the rotor axis.

6. An assembly as claimed in claim 1 further including:

(a) adjustment means for adjusting length of at least one of the first and second link means.

7. An assembly as claimed in claim 2 in which:

(a) each coupling means has an arm and a toggle connector, the arm having an inner portion hingedly connected to the body to permit rotation relative to the body about a respective hinge axis, and an outer portion carrying the toggle connector, the toggle connector having oppositely disposed connector faces spaced apart to receive a respective switch toggle therebetween.

8. An assembly as claimed in claim 7 in which:

(a) the toggle connector includes a toggle recess defined in part by the two connector faces, the toggle recess facing toward the hinge axis so that the connector faces operatively embrace the switch toggle, (b) the outer ends of the link means are hingedly connected to the respective arms of the coupling means at positions intermediate of the toggle connector and the hinge axis.

9. An assembly as claimed in claim 2 in which:

(a) each coupling means has a pair of spaced parallel arms and a toggle connector, the arms having inner portions hingedly connected to the body to permit rotation relative to the body about the respective hinge axis, and outer portions carrying the toggle connector extending therebetween so as to define a U-shaped yoke, the toggle connector having oppositely disposed connector faces spaced apart to receive a respective switch toggle therebetween.

10. An assembly as claimed in claim 9 in which:
(a) the toggle connector includes a toggle recess defined in part by the connector faces, the toggle recess facing towards the hinge axis so that connector faces operatively embrace the switch toggle,
(b) the outer ends of the link means are hingedly connected to the respective arms of the coupling means at positions intermediate of the toggle connector and the hinge axis.

11. An assembly as claimed in claim 1 further including:
(a) a powered shaft which is powered for rotation relative to the body about the rotor axis, the rotor means cooperating with the shaft,
(b) a manual lever operatively connected to the rotor means and having an engagement means for releasably connecting and disconnecting the rotor means and the powered shaft, so as to permit manual or powered rotation of the rotor means as required.

12. An assembly as claimed in claim 1 in which:
(a) the rotor means is mounted on a powered shaft journalled for rotation relative to the body.
and the assembly further includes:
(b) a motor connected to the shaft of the rotor means to rotate the rotor means,
(c) limiting means for limiting rotation of the rotor to that necessary to open one circuit breaker and to close the other circuit breaker, the limiting means being responsive to movement of the coupling means.

13. An assembly as claimed in claim 12 further including:
(a) a manual lever cooperating with the rotor means and having an engagement means for releasably connecting and disconnecting the rotor means and the powered shaft so as to permit powered or manual rotation of the rotor means as required.

14. An assembly as claimed in claim 13 in which:
(a) the engagement means is mounted for rotational movement with the rotor means, the engagement means having an inner end adapted to engage the powered shaft, and an outer end to serve as the manual lever for gripping by an operator to move the engagement means relative to the shaft so as to engage or disengage the powered shaft as required.

15. An assembly as claimed in claim 1 in which:
(a) in a first operating position, the link means extending to the coupling means cooperating with a circuit breaker that is presently closed is disposed generally tangentially relative to a circle concentric with the rotor axis,
(b) in the said first operating position, the remaining link means extending to the coupling means cooperating with the circuit breaker that is presently open is disposed generally radially relative to the rotor axis.

16. An assembly as claimed in claim 1 further including:
(a) the first and second circuit breakers being disposed as mirror images of each other about an extension of the rotor axis,
so that open and closed positions of the circuit breakers are disposed symmetrically of the extension of the rotor axis.

17. An assembly as claimed in claim 16 in which:
(a) the closed position of each circuit breaker is closest to the extension of the rotor axis, and the open position of each circuit breaker is furthest from the extension of the rotor axis.

18. An assembly as claimed in claim 17 in which:
(a) in a first operating position, the link means extending to the coupling means cooperating with the circuit breaker that is presently closed is disposed generally tangentially relative to a circle concentric with the rotor axis,
(b) in the said first operating position, the remaining link means extending to the coupling means cooperating with the circuit breaker that is presently open is disposed generally radially relative to the rotor axis.

* * * * *